(12) United States Patent
Shiraki

(10) Patent No.: US 8,230,132 B2
(45) Date of Patent: Jul. 24, 2012

(54) MANAGEMENT DEVICE AND COMPUTER READABLE MEDIUM

(75) Inventor: Tomomi Shiraki, Nagoya (JP)

(73) Assignee: Brother Kogyo Kabushiki Kaisha, Aichi-Ken (JP)

( * ) Notice: Subject to any disclaimer, the term of this patent is extended or adjusted under 35 U.S.C. 154(b) by 114 days.

(21) Appl. No.: 12/697,729

(22) Filed: Feb. 1, 2010

(65) Prior Publication Data

US 2010/0198996 A1 Aug. 5, 2010

(30) Foreign Application Priority Data

Jan. 30, 2009 (JP) ................................. 2009-019112

(51) Int. Cl.
*G06F 3/00* (2006.01)
(52) U.S. Cl. ............... 710/19; 710/15; 710/16; 710/17; 710/18
(58) Field of Classification Search ........................ None
See application file for complete search history.

(56) References Cited

U.S. PATENT DOCUMENTS

| 6,557,122 | B1* | 4/2003 | Sugauchi et al. ............... 714/57 |
| 6,734,985 | B1* | 5/2004 | Ochiai ........................... 358/1.15 |
| 6,832,247 | B1* | 12/2004 | Cochran et al. ............... 709/223 |
| 7,730,030 | B1* | 6/2010 | Xu ................................. 707/617 |
| 2002/0013869 | A1* | 1/2002 | Taniguchi et al. ............... 710/33 |
| 2002/0120699 | A1 | 8/2002 | Wakabayashi | |
| 2003/0014511 | A1 | 1/2003 | Maekawa et al. | |
| 2003/0084150 | A1* | 5/2003 | Hansen et al. ................. 709/224 |
| 2004/0090643 | A1* | 5/2004 | Ochi ............................. 358/1.13 |
| 2004/0172469 | A1* | 9/2004 | Takahashi et al. ............. 709/224 |
| 2008/0126228 | A1 | 5/2008 | Nagai et al. | |

FOREIGN PATENT DOCUMENTS

| JP | 2001-202303 A | 7/2001 |
| JP | 2002-262049 | 9/2002 |
| JP | 2003-108448 | 4/2003 |
| JP | 2004-46536 A | 2/2004 |
| JP | 2008-159022 A | 7/2008 |

OTHER PUBLICATIONS

Notification of Reason for Refusal dated Jan. 25, 2011 in Japanese Patent Application No. 2009-019112 together with English language translation.

* cited by examiner

*Primary Examiner* — Henry Tsai
*Assistant Examiner* — Kris Rhu
(74) *Attorney, Agent, or Firm* — Scully, Scott, Murphy & Presser, P.C.

(57) ABSTRACT

A management device for managing a device has: a control unit including: a status acquiring unit that acquires a status of the device; and a notifying unit that, if the device is in a specific status, notifies information about the specific status to another device; and a first management screen supply unit supplying first management screen data to a display unit, wherein the control unit determines whether a notifying function of the notifying unit is valid or invalid, if the notifying function is valid, the control unit controls the status acquiring unit to periodically acquire the status of the device regardless of whether the first management screen supply unit starts up, and if the notifying function is invalid, the control unit controls the status acquiring unit to acquire the status of the device when the first management screen supply unit starts up in response to an instruction from a user.

7 Claims, 19 Drawing Sheets

US 8,230,132 B2

MANAGEMENT DEVICE AND COMPUTER READABLE MEDIUM

CROSS REFERENCE TO RELATED APPLICATION

The present application claims priority from Japanese Patent Application No. 2009-019112, which was filed on Jan. 30, 2009, the disclosure of which is herein incorporated by reference in its entirety.

TECHNICAL FIELD

Apparatuses and devices consistent with the present invention relate to an acquisition of the status of a management target device.

BACKGROUND

There is a network system in which various types of devices are connected to a network such that they can communicate with each other. Such a network system has a management device that manages various types of devices. For example, a related art management device acquires information, which indicates a status of a device connected to the network, from the device by communication according to SNMP (simple network management protocol) and notifies an error by e-mail when the error occurs in the device.

SUMMARY

However, in general, the above described related art management device periodically acquires the status (information) of a management target device. Therefore, a large amount of load is applied to the management device.

An object of the invention is to provide a technique capable of reducing the load of a management device that acquires the status of a management target device.

According to the invention that has been made in order to solve the above-mentioned problems, the acquisition timing of the status of a management target device is changed depending on whether a function of notifying the acquired status of the management target device to another device is valid or invalid.

According to an illustrative aspect of the present invention, there is provided a management device for managing a device, comprising: a control unit that comprises: a status acquiring unit that acquires a status of the device; and a notifying unit that, if the device is in a specific status, notifies information about the specific status to another device; and a first management screen supply unit that supplies first management screen data to a display unit, the first management screen data being used for showing a first management screen in which the acquired status of the device is indicated, wherein the control unit determines whether or not a notifying function of the notifying unit is valid or invalid, if the notifying function of the notifying unit is valid, the control unit controls the status acquiring unit to periodically acquire the status of the device regardless of whether the first management screen supply unit starts up or not, and if the notifying function of the notifying unit is invalid, the control unit controls the status acquiring unit to acquire the status of the device when the first management screen supply unit starts up in response to an instruction from a user.

According to the invention, it is possible to achieve a technique capable of reducing the process load of a management device that acquires the status of a management target device.

The invention may be applied to various aspects, such as a management device, a management method, a computer program for implementing the functions of the method or the device, and a recording medium having the computer program recorded thereon.

BRIEF DESCRIPTION OF THE DRAWINGS

Illustrative aspects of the invention will be described in detail with reference to the following figures wherein.

DETAILED DESCRIPTION OF EXEMPLARY EMBODIMENTS OF THE PRESENT INVENTION

Hereinafter, exemplary embodiments of the invention for solving the above-mentioned problems will be described in detail with reference to the accompanying drawings. The means for solving the problems is not limited to the following structure, but various structures may be used without departing from the technical idea of the invention.

(Structure of System)

Figure 1:
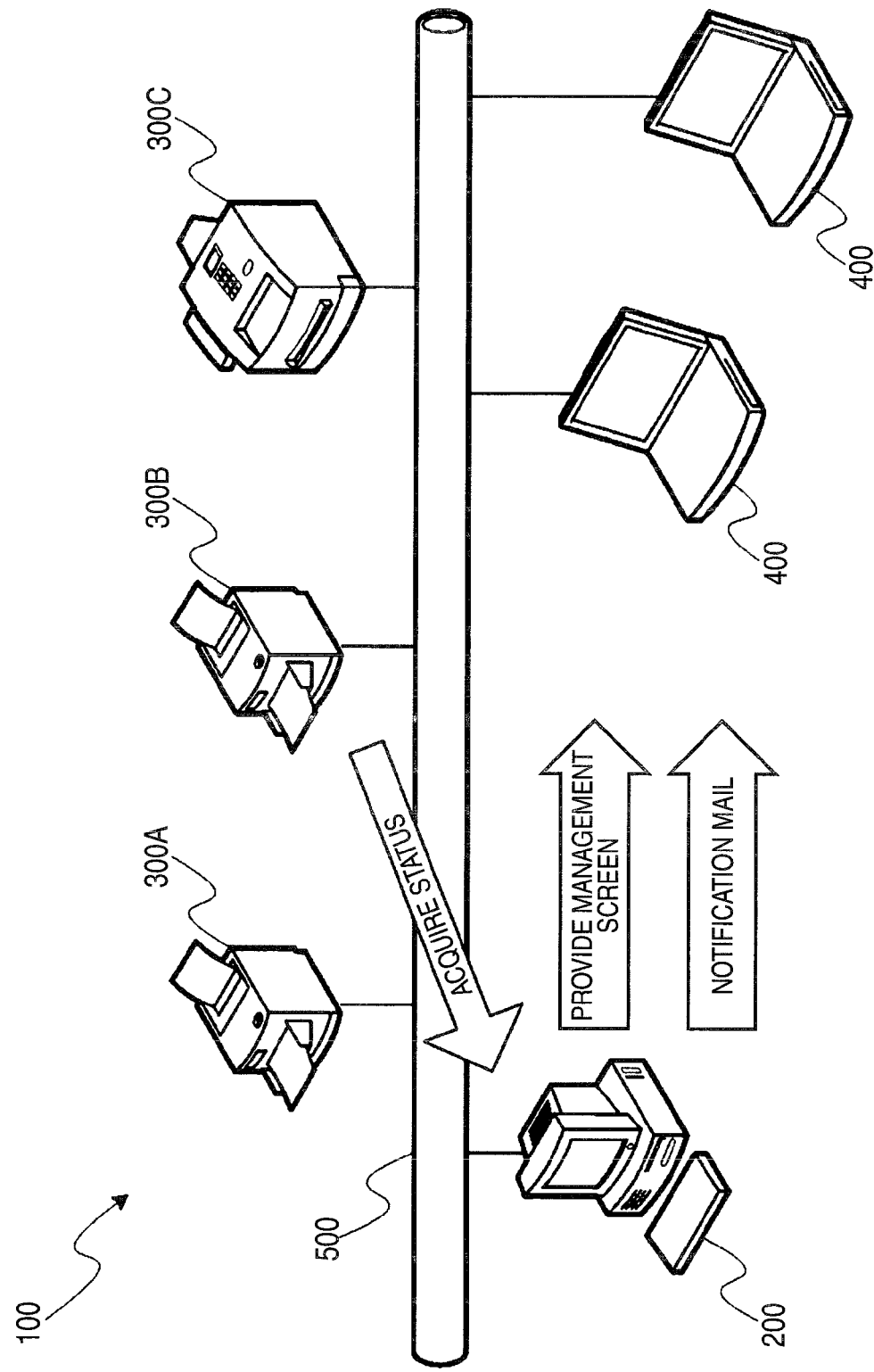
FIG. 1 is a diagram illustrating a network system.

FIG. 1 is a diagram illustrating a network system. A network system 100 includes a management device 200, printing devices 300A and 300B and a multi-function machine 300C having, for example, a facsimile function and a print function. The network system 100 includes a plurality of management clients 400 (two management clients in FIG. 1). The management device 200, the printing devices 300A and 300B, and the multi-function machine 300C are connected through a network 500 such that they can communicate with each other.

The management client 400 is connected to the management device 200 through the network 500 so as to communicate therewith. In the following description, the printing devices 300A and 300B and the multi-function machine 300C, which are management targets, are generally referred to as management target devices 300.

Figure 2:
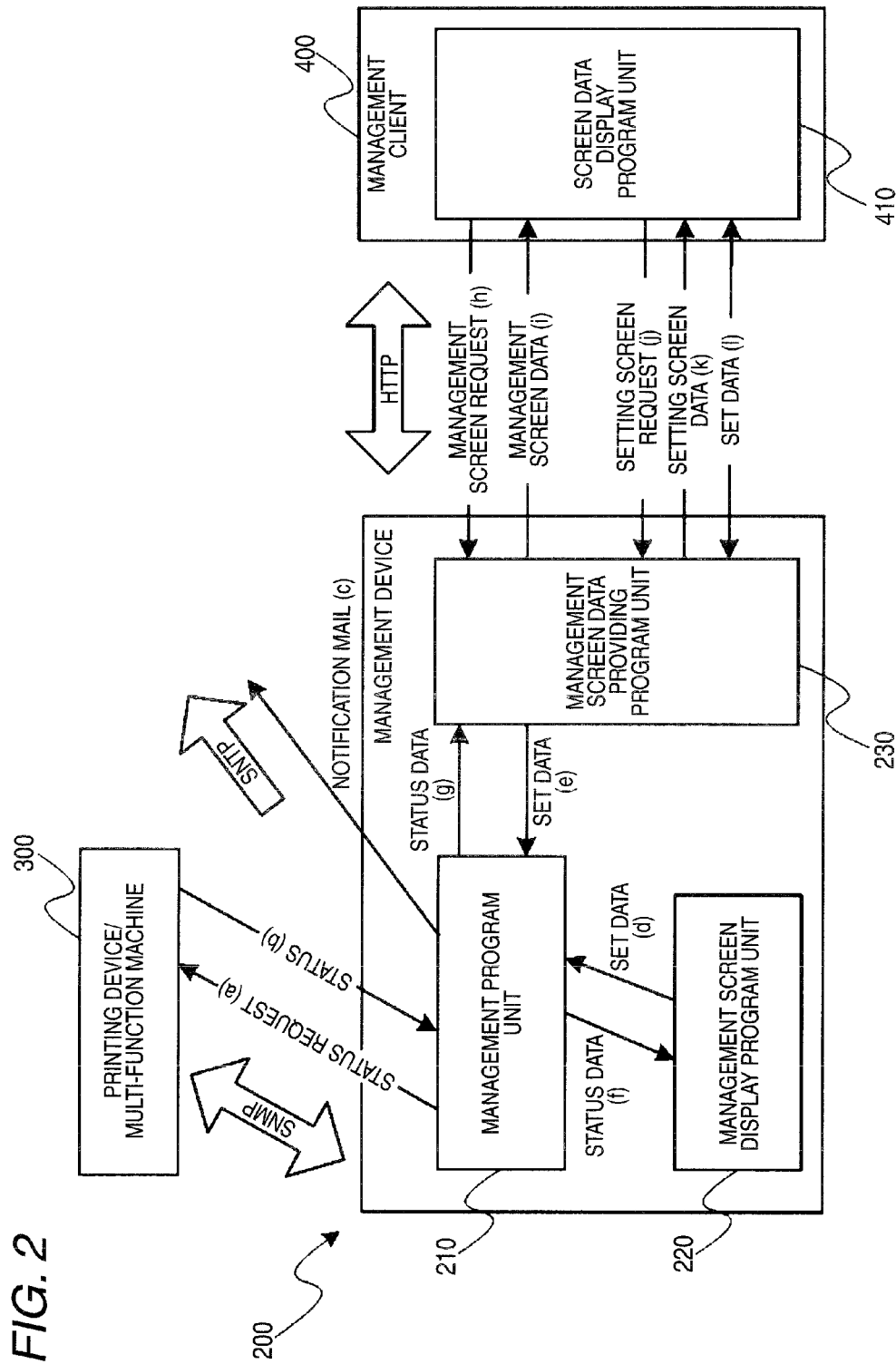
FIG. 2 is a diagram illustrating the functional blocks of each device included in the network system.

FIG. 2 shows functional blocks implemented by the network system. First, the management device 200 will be described. The management device 200 includes a management program unit 210, a management screen display program unit 220, and a management screen data providing program unit 230. For example, these program units are configured by allowing a CPU that forms the management device and performs various operating processes to execute on each RAM a management program, a management display program, and a management screen data providing program installed on, for example, a hard disk.

The management program unit 210 checks and stores the state (hereinafter, referred to as "status") of the management target device 300 periodically or in response to instructions input from a user through an operating unit (for example, a keyboard or a mouse) of the management device. Specifically, first, the management program unit 210 requests the management target device 300 to transmit its status ((a) of FIG. 2), receives the status from the management target device 300, and stores the received status ((b) of FIG. 2). The management program unit repeatedly requests the management target device 300 to transmit the status at a designated interval. The status is stored in, for example, the RAM or the hard disk of the management device 200.

When the status of the management target device 300 is a predetermined status, specifically, a cover open status or a toner empty status, the management program unit 210 notifies the status of the management target device 300 to a predetermined manager by e-mail ((c) of FIG. 2). The management program unit 210 receives set data from, for example, the management screen display program unit 220 and the management screen data providing program unit 230 ((d) and (e) of FIG. 2), and stores the received set data. The set data includes, for example, data related to the on/off of a function of periodically acquiring the status from the management target device 300 (hereinafter, referred to as an "auto refresh function") and data related to the on/off of a function of notifying the status to the manager by e-mail. In addition, the set data includes data related to a management screen providing function capable of managing the management target device 300 using a screen data display program unit 410 installed in the management client 400. The management program unit 210 provides the status to the management screen display program unit 220 and the management screen data providing program unit 230 ((f) and (g) of FIG. 2)

The management screen display program unit 220 displays on a monitor of the management device 200 an operation setting screen for setting the on/off of the auto refresh function and a status notification setting screen for setting the on/off of the function of notifying the status to the manager by e-mail, and provides set data input by the user to the management program unit 210 ((d) of FIG. 2).

The management screen display program unit 220 acquires information including the status of each management target device 300 stored in the management program unit 210 ((f) of FIG. 2), and displays the acquired information on the monitor of the management device 200.

Figure 3:
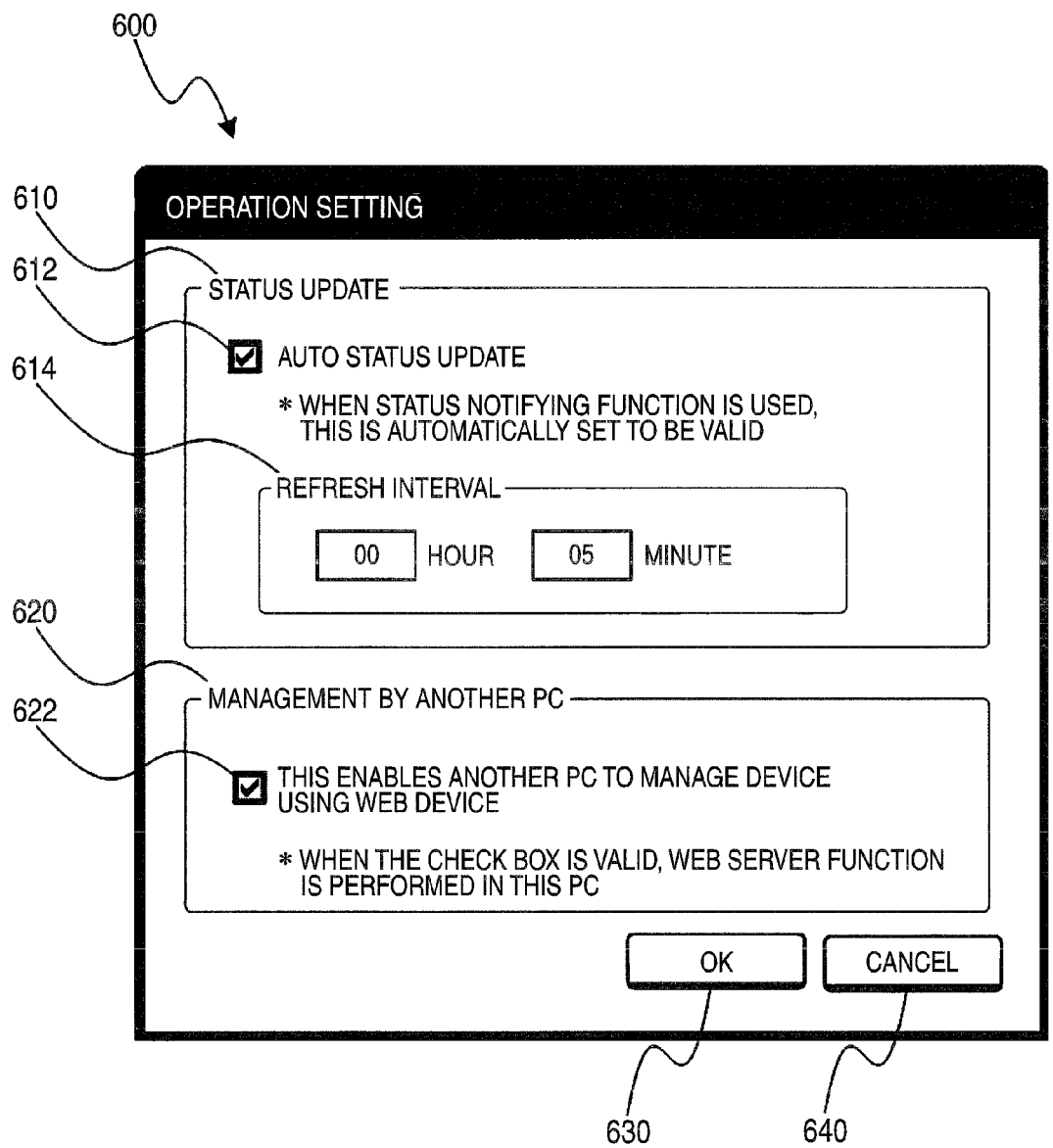
FIG. 3 is a diagram illustrating an operation setting screen.

FIG. 3 shows an operation setting screen 600. The operation setting screen 600 includes a status update field 610 for setting the on/off of the auto refresh function and a management client function field 620 for setting whether to perform a management instruction from the management client 400. The status update field 610 includes an auto update check box 612 for inputting (checking) an instruction to turn on the auto refresh function (auto status update) and a refresh interval designating box 614 for designating a refresh interval. The management program unit 210 requests the management target device 300 to transmit its status at the interval designated by the refresh interval designating box 614. It is possible to designate the interval in the interval designating box 614 regardless of whether the auto update check box 612 is checked.

The management client function field 620 includes an external management check box 622 for inputting (checking) an instruction to turn on the management screen providing function. The operation setting screen 600 includes an OK button 630 for checking the instructions input to the status update field 610 and the management client function field 620 and a cancel button 640 for canceling the setting of the operation setting screen 600.

Figure 4:
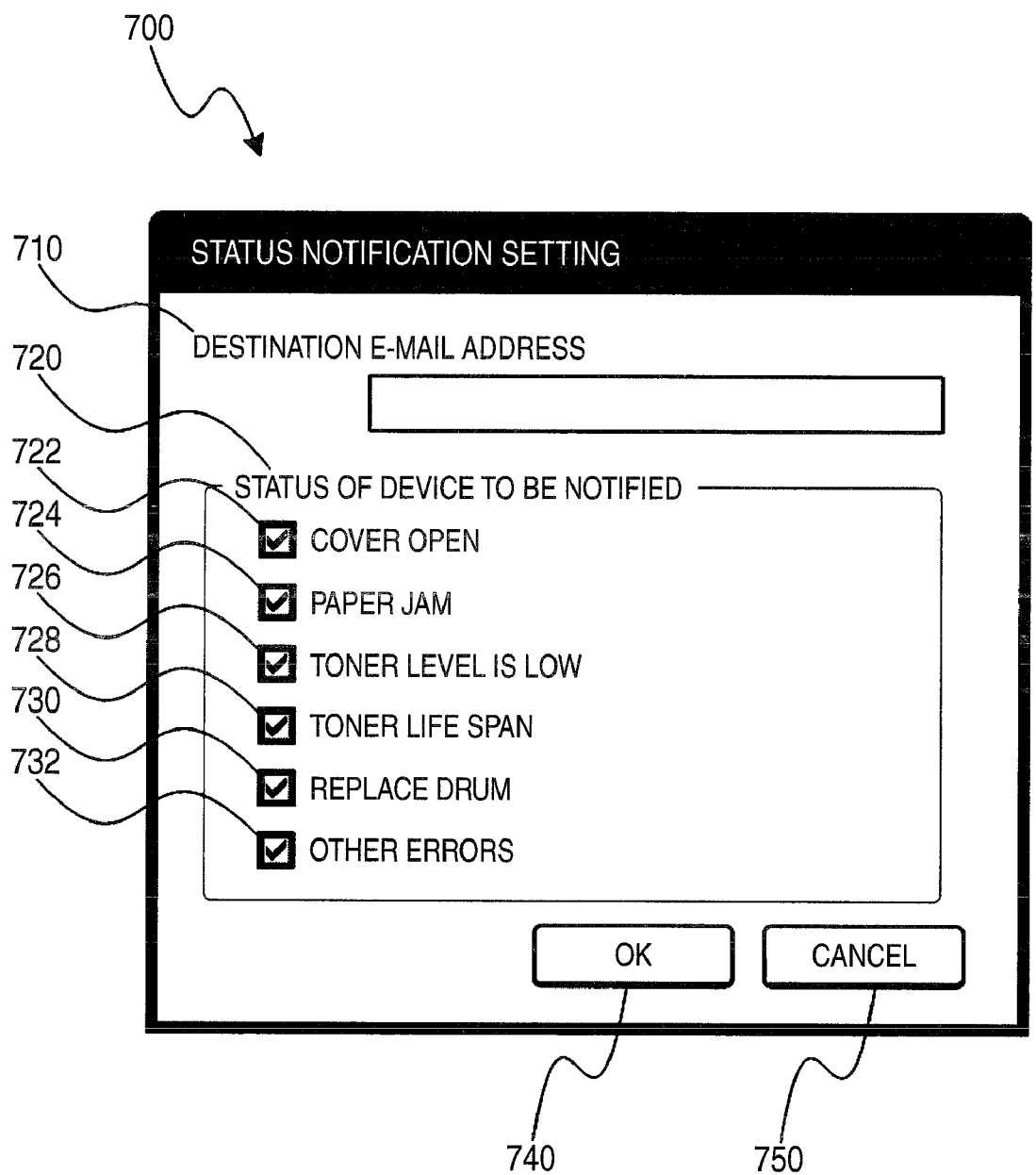
FIG. 4 is a diagram illustrating a status notification setting screen.

FIG. 4 shows a status notification setting screen 700. The status notification setting screen 700 includes a destination address designating box 710 and a notification target status designating field 720. The destination address designating box 710 is for designating the e-mail address of a destination to which the status notification is sent and the e-mail address of the manager is registered in destination address designating box. The notification target status designating field 720 is for designating the status of a notification target, and includes a plurality of check boxes 722 to 732 corresponding to a plurality of statuses to be notified. For example, when a toner life span check box 728 is checked and the toner level of a cartridge provided in the management target device 300 is zero, notification information indicating that there is no toner is sent to the e-mail address of the destination designated by the destination address designating box 710.

The status notification setting screen 700 includes an OK button 740 for confirming the instructions input to the destination address designating box 710 and the notification target address designating field 720 and a cancel button 750 for canceling the setting of the status notification setting screen 700.

The management screen data providing program unit 230 provides (transmit) management image data for displaying the status of the management target devices 300 other than the management target device whose status is stored in the management program unit 210 to the screen data display program unit 410, in response to a request ((h) of FIG. 2) from the screen data display program unit 410 of the management client 400 ((i) of FIG. 2). In addition, the management screen data providing program unit 230 provides, for example, set screen data (see FIG. 3) for setting the on/off of the auto refresh function and the on/off of the management screen providing function and set screen data (see FIG. 4) for setting the on/off of the notifying function to the screen data display program unit 410, in response to a request ((j) of FIG. 2) from the screen data display program unit 410 ((k) of FIG. 2). When the set screen data is provided, the management screen data providing program unit 230 acquires the set data input by the management client 400 from the screen data display program unit 410 ((l) of FIG. 2), and provides the acquired data to the management program unit 210 ((e) of FIG. 2). The screen data display program unit 410 includes a Web browser function.

Communication between the management device 200 and the management target device 300 is implemented by SNMP. Communication between the management device 200 and the management client 400 is implemented by HTTP (hyper text transfer protocol). The e-mail notification from the management device 200 to the manager is implemented by SMTP (simple mail transfer protocol).

Three processes implemented by the management program unit 210, the management screen display program unit 220, and the management screen data providing program unit 230 will be described.

(First Process Aspect)

(Management Service Process)

Figure 5:
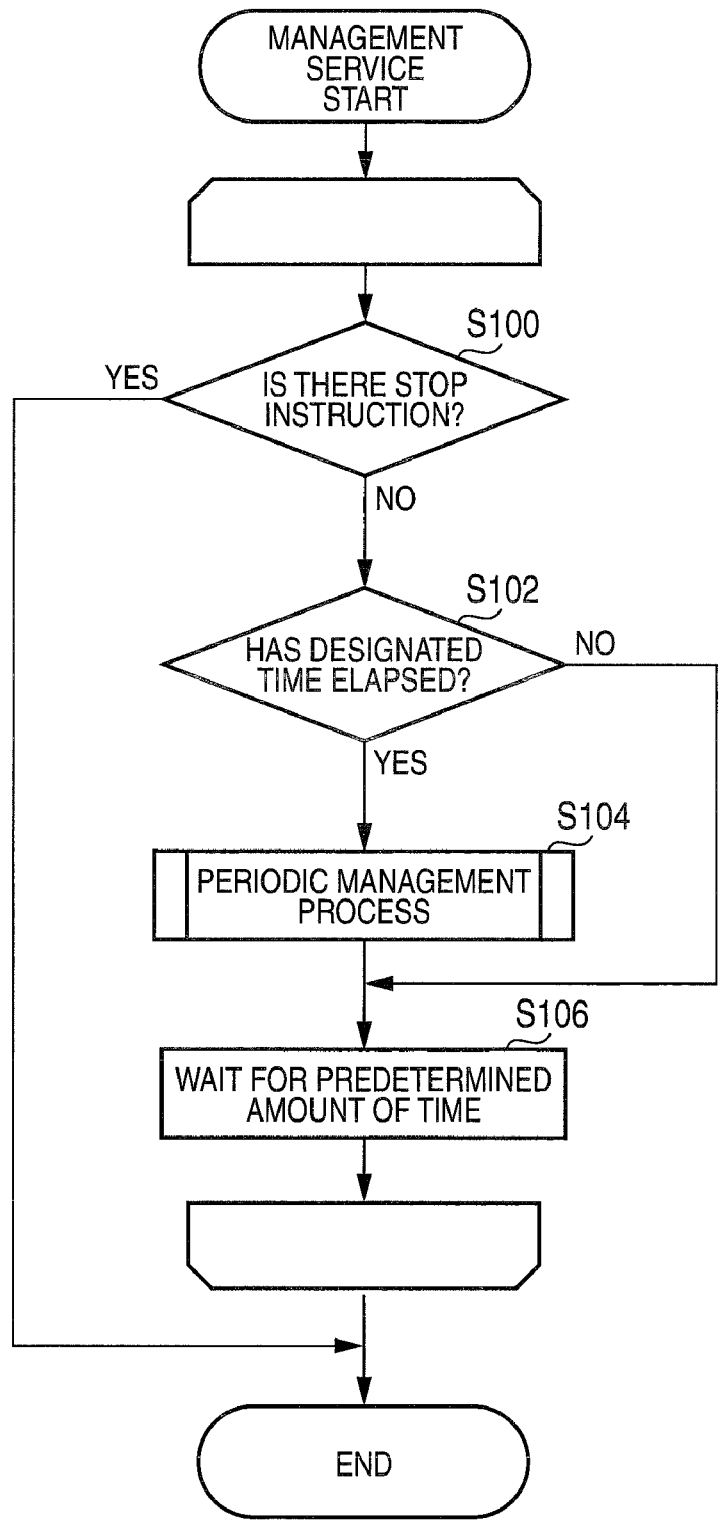
FIG. 5 is a flowchart illustrating a management service process.

FIG. 5 is a flowchart illustrating a management service process. The management service process is implemented by the management program unit 210.

The management program unit 210 starts the process and determines whether the user uses the operating unit of the management device 200 to input an instruction to stop the process (S100). If it is determined that the stop instruction is not input (S100: No), the management program unit 210 determines whether the time designated by the refresh interval box 604 shown in FIG. 3 has elapsed from the execution of the previous auto refresh function (S102). If it is determined that the designated time has not elapsed (S102: No), the management program unit 210 proceeds to Step S106. On the other hand, if it is determined that the designated time has elapsed, the management program unit 210 performs a periodic management process (S104), and proceeds to Step S106. The periodic management process will be described in detail below.

In Step S106, the management program unit 210 waits for a predetermined amount of time and then returns to Step S100. If it is determined in Step S100 that the stop instruction is input (S100: Yes), the management program unit 210 ends the process.

(Periodic Management Process)

Figure 6:
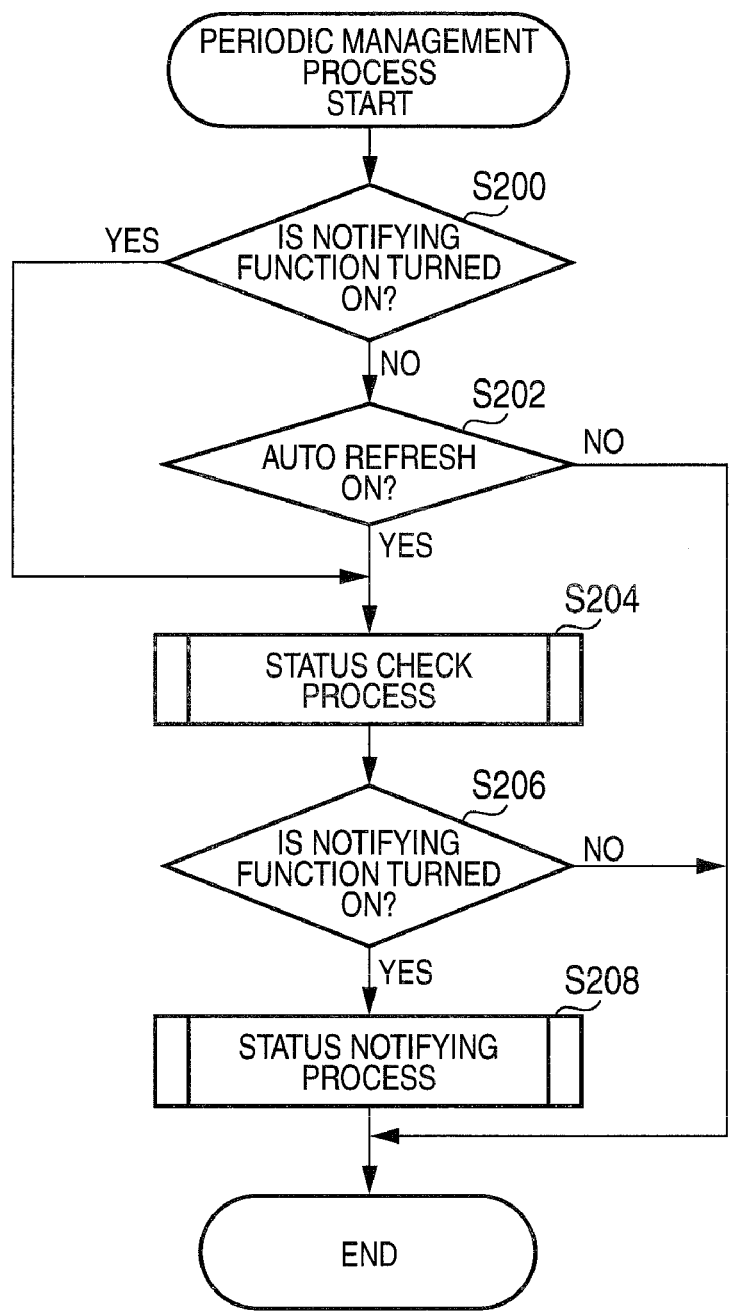
FIG. 6 is a flowchart illustrating a periodic management process in a first process aspect.

FIG. 6 is a flowchart illustrating the periodic management process performed in Step S104 of FIG. 5. The periodic management process is implemented by the management program unit 210. After starting the process, first, the management program unit 210 determines whether a notifying function of notifying the status to the manager by e-mail is turned on, on the basis of the set data for setting the on/off of the notifying function received from the management screen display program unit 220 or the management screen data providing program unit 230 (see (d) and (e) of FIG. 2 and FIG. 4) (S200). If it is determined that the notifying function is turned on (S200: Yes), the management program unit 210 proceeds to Step S204. On the other hand, if it is determined that the notifying function is turned off (S200: No), the management program unit 210 determines whether the auto refresh function for periodically acquiring the status of the management target device 300 is turned on or off (S202). In this case, similar to the notifying function, the management program unit 210 determines whether the auto refresh function is turned on or off, on the basis of the set data for setting the on/off of the auto refresh function received from the management screen display program unit 220 or the management screen data providing program unit 230 (see (d) and (e) of FIG. 2 and the status update field 610 of FIG. 3).

If it is determined in Step S200 that the notifying function is turned on (S200: Yes) and if it is determined in Step S202 that the auto refresh function is turned on (S202: Yes), the management program unit 210 performs a status check process (S204). The status check process (see FIG. 8) will be described in detail below. After performing the status check process, the management program unit 210 determines whether the notifying function is turned on again (S206). If it is determined that the notifying function is turned on (S206: Yes), the management program unit 210 performs a status notifying process (S208). The status notifying process (see FIG. 9) will be described in detail below.

If it is determined in Step S202 that the auto refresh function is turned off (S202: No), if it is determined in Step S206 that the notifying function is turned off (S206: No), and if Step S208 is performed, the management program unit 210 ends the process and returns to Step S106 of FIG. 5.

(Management Screen Display Process)

Figure 7:
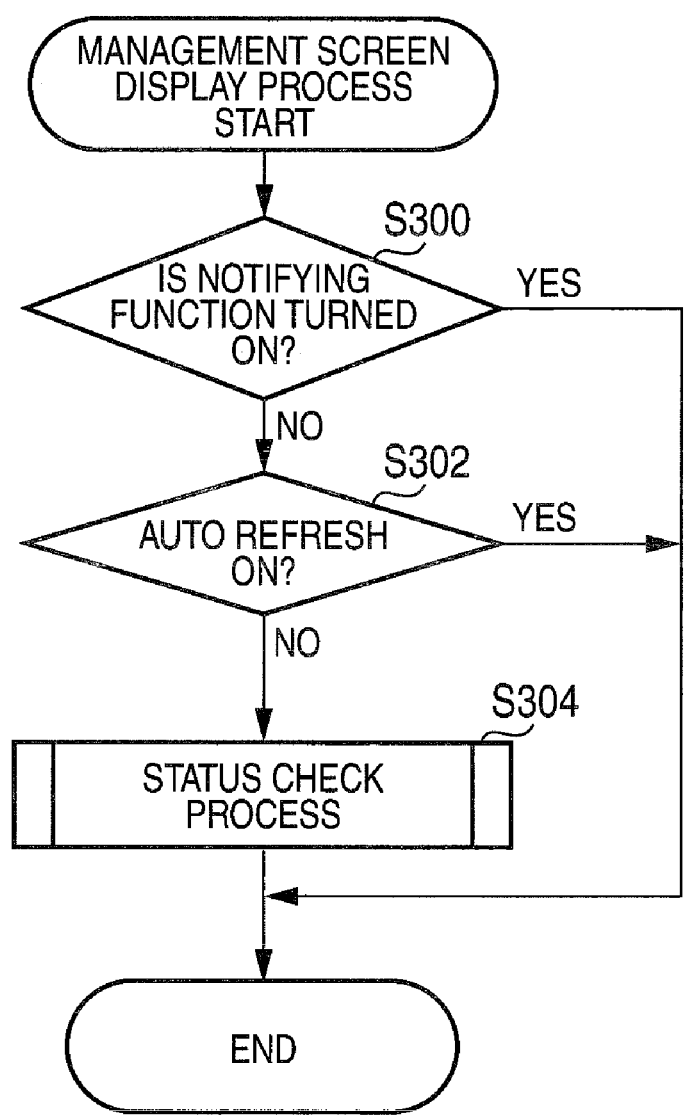
FIG. 7 is a flowchart illustrating a management screen display process in the first process aspect.

FIG. 7 is a flowchart illustrating a management screen display process. The management screen display process is implemented by the management program unit 210. This process starts in response to an execution instruction from the management screen display program unit 220 (which will be described in detail below).

After starting the process, the management program unit 210 determines whether the notifying function is turned on (S300). If it is determined that the notifying function is turned off (S300: No), the management program unit 210 determines whether the auto refresh function is turned on (S302). If it is determined that the auto refresh function is turned off (S302: No), the management program unit 210 performs the status check process (S304).

If it is determined that the notifying function is turned on (S300: Yes), if it is determined that the auto refresh function is turned on (S302: Yes), or if the status check process in Step S304 is performed, the management program unit 210 ends the process. When the process ends, the management program unit 210 notifies the management screen display program unit 220 instructing the start of the process that the process has finished.

(Status Check Process)

Figure 8:
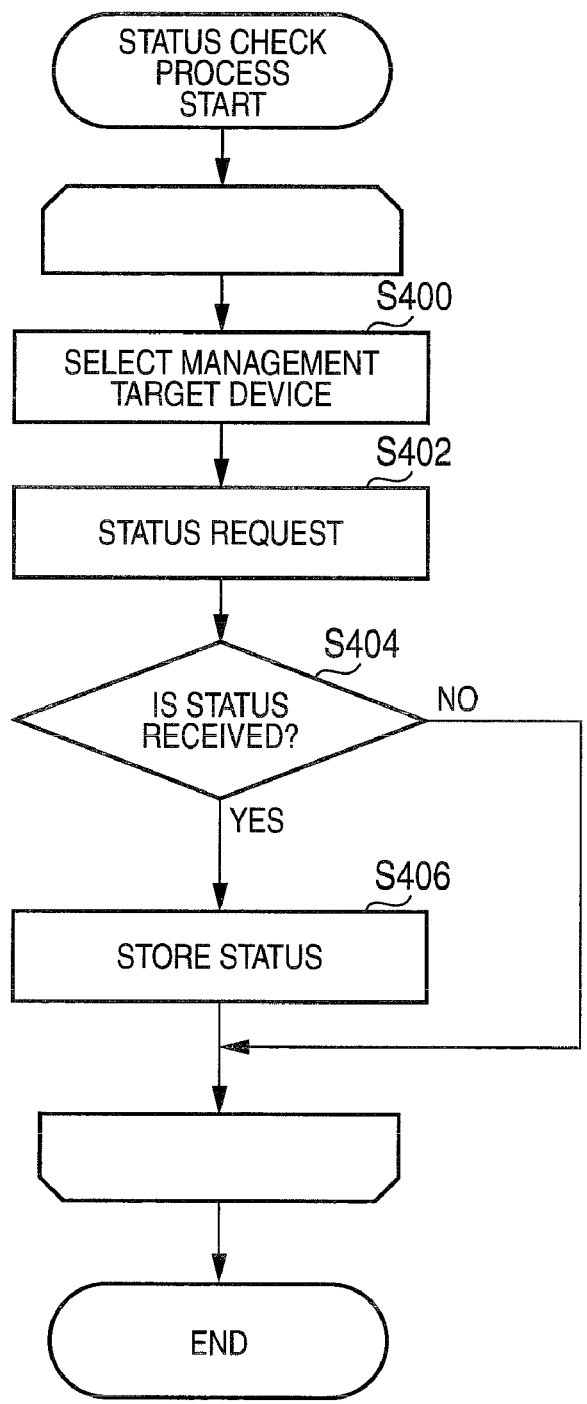
FIG. 8 is a flowchart illustrating a status check process.

FIG. 8 is a flowchart illustrating the status check process. The status check process is implemented by the management program unit 210 and is performed in Step S204 of FIG. 6 in which the periodic management process is performed and Step S304 of FIG. 7 in which the management screen display process is performed. When there is a plurality of management target devices 300, the status check process is performed on each of the management target devices 300. Specifically, in FIG. 1, the status check process is sequentially performed on the printing device 300A, the printing device 300B, and the multi-function machine 300C.

The management program unit 210 selects one management target device 300, specifically, the printing device 300A (S400), and requests the selected printing device 300A to transmit its status (S402) (see (a) of FIG. 2). After performing Step S402, the management program unit 210 determines whether the status of the management target device 300, for example, the printing device 300A that is requested to transmit the status in Step S402 is received (S404). If it is determined that the status is received (S404: Yes), the management program unit 210 stores the received status (S406) (see (b) of FIG. 2). On the other hand, if it is determined that the status is not received within a predetermined amount of time, that is, the time is out (S404: No) and if the status is stored in Step S406, the management program unit 210 returns to Step S400. Then, the management program unit 210 selects the next management target device 300, and repeatedly performs the process from Step S402 to Step S406. Specifically, the management program unit 210 sequentially selects the printing device 300B and the multi-function machine 300C and performs the process from Step S402 to Step S406 on the selected device. When the process performed on each of the management target devices 300 ends, the management program unit 210 ends the status check process.

(Status Notifying Process)

Figure 9:
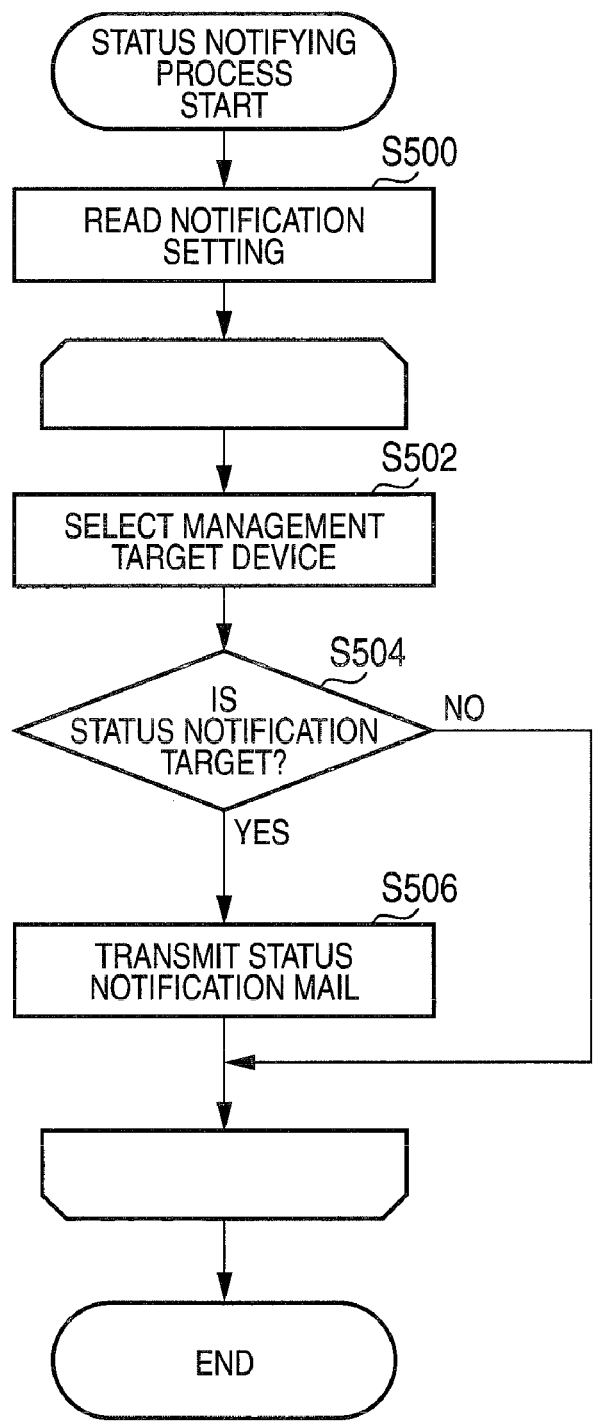
FIG. 9 is a flowchart illustrating a status notifying process.

FIG. 9 is a flowchart illustrating the status notifying process performed in Step S208 of FIG. 6. The status notifying process is implemented by the management program unit 210. After starting the status notifying process, the management program unit 210 reads notification data set on the basis of an instruction that is input by the user to the status notification setting screen 700 shown in FIG. 4 through the operating unit, specifically, set data related to the notifying function (S500). Then, the management program unit 210 selects one management target device 300, specifically, the printing device 300A (S502). Then, the management program unit 210 determines whether the status of the printing device 300A received in the status check process (see S404 of FIG. 8: Yes) shown in FIG. 8 is a notification target by the notifying function on the basis of the set data read in Step S500 (S504).

If it is determined in Step S504 that the status is a notification target (S504: Yes), the management program unit 210 transmits a status notification mail to the e-mail address, which is a destination, included in the set data read in Step S500 (the e-mail address designated by the destination address designating box 710 shown in FIG. 4) (S506). If it is determined in Step S504 that the status is not a notification target (S504: No) and if Step S506 is performed, the management program unit 210 returns to Step S502. Then, the management program unit 210 sequentially selects the next management target devices 300 (the printing device 300B and the multi-function machine 300C), and repeatedly performs Steps S504 and S506 on the selected device. When the process performed on each of the management target devices 300 ends, the management program unit 210 ends the status check process.

(Management Screen Display Process)

Figure 10:
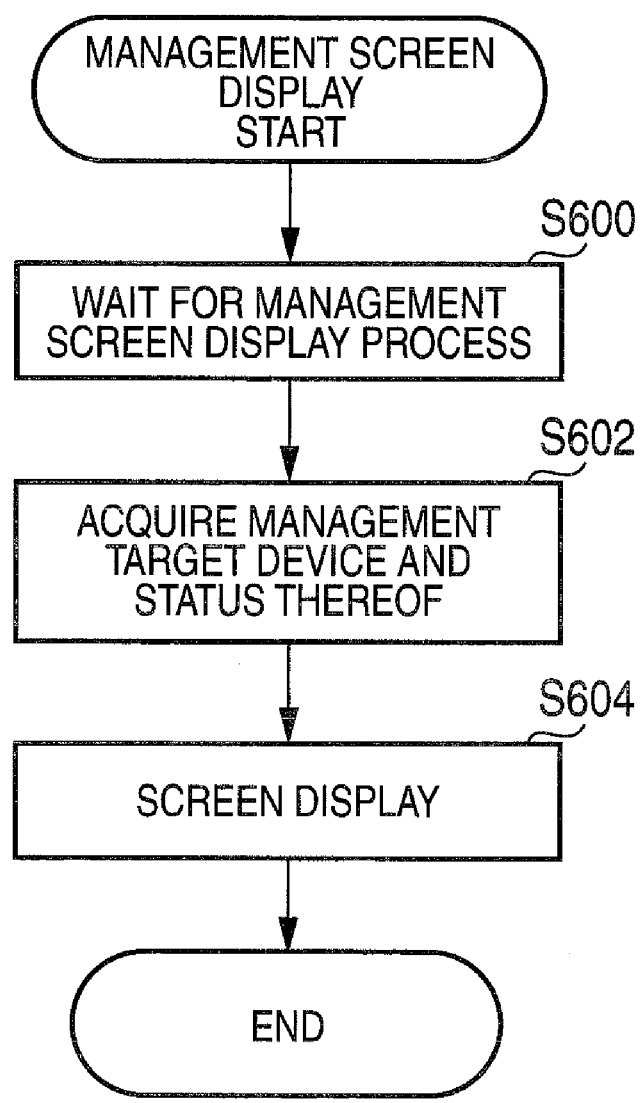
FIG. 10 is a flowchart illustrating the management screen display process.

FIG. 10 is a flowchart illustrating the management screen display process. The management screen display process is implemented by the management screen display program unit 220 when the user operates the operating unit of the management device 200 to input an instruction to display a management screen showing the status of the management target device 300. The management screen display program unit 220 waits for the execution of the management screen display process (see FIG. 7) by the management program unit 210 (S600). When acquiring a notice indicating that the management screen display process (see FIG. 7) has executed (completed) in the standby state, the management screen display program unit 220 acquires identifiers of the management target devices 300 and the status of each of the management target device 300 from the management program unit 210 (S602). Then, the management screen display program unit 220 displays the management screen including the acquired information on the monitor of the management device 200 (S604), and ends the process.

Figure 11:
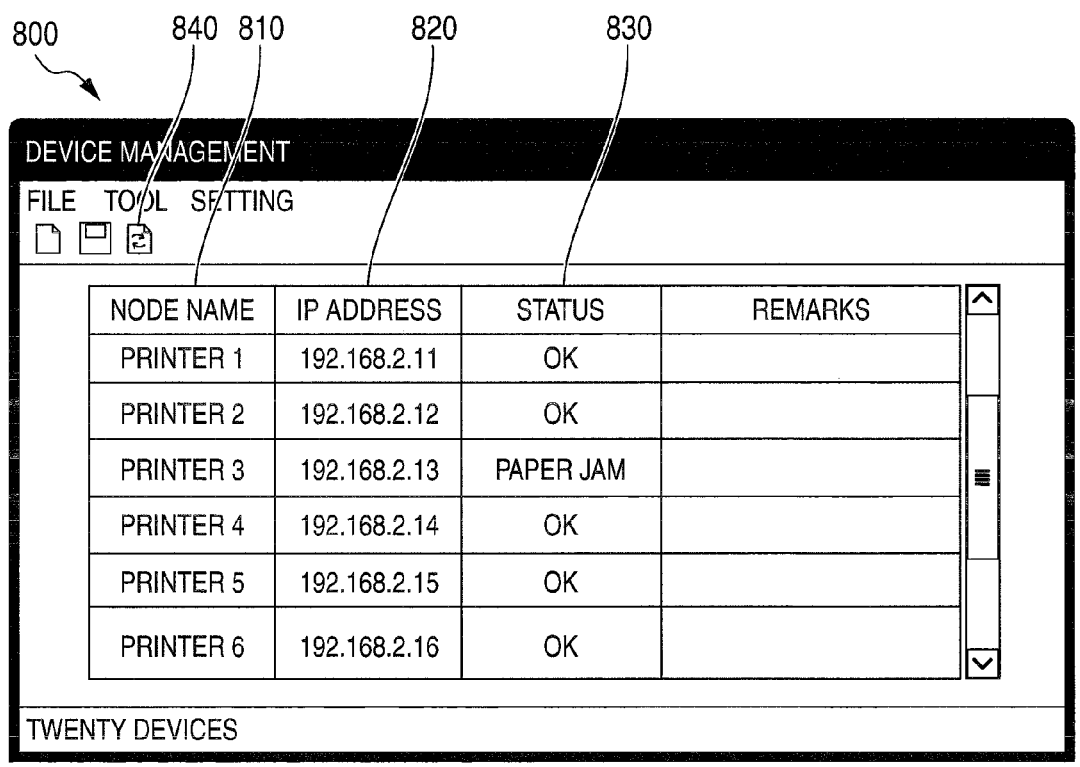
FIG. 11 is a diagram illustrating a management screen displayed on a monitor of a management device.

FIG. 11 shows the management screen. A management screen 800 includes a node name 810 indicating each of the management target devices 300, an IP address 820 that is allocated to each of the management target devices 300, and a status 830 indicating the status of each of the management target device 300. The user can check the management screen 800 to know that the printing device 300A having a node mane "PRINTER1" has an IP address "192.168.2.11" and the status thereof is "OK (there is no problem)". In addition, the user can know that the multi-function machine 300C having a node mane "PRINTER3" has an IP address "192.168.2.13" and the current status thereof is a "paper jam".

The management screen 800 includes an update button 840 for manually updating the statue of each of the management target devices 300. When the user operates the operating unit of the management device 200 to press the update button 840, the management program unit 210 acquires the status of each of the management target devices 300 and the management screen display program unit 220 updates the content displayed on the management screen 800 on the basis of, for example, the newly acquired status of each of the management target devices 300.

Figure 12:
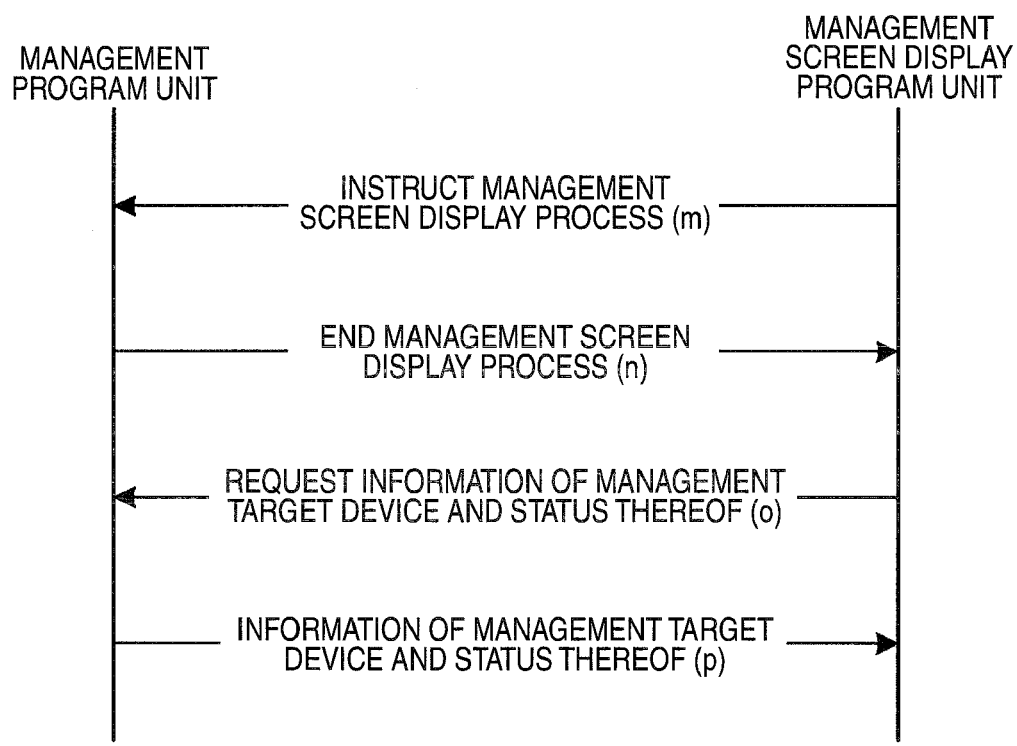
FIG. 12 is a diagram illustrating a process sequence performed between a management program unit and a management screen display program unit.

FIG. 12 shows a process sequence related to the management screen display process that is performed between the management program unit 210 and the management screen display program unit 220. As can be seen from FIG. 12, when starting the management screen display process shown in FIG. 10, the management screen display program unit 220 instructs the management program unit 210 to perform the management screen display process (see (m)). The management screen display program unit 220 waits for the reception of an end notice from the management program unit 210 (see Step S600 of FIG. 10). The management program unit 210 receives the instruction from the management screen display program unit 220 and starts the management screen display process shown in FIG. 7. When the management screen display process ends, the management program unit 210 transmits an end notice indicating that the management screen display process has ended to the management screen display program unit 220 (see (n)).

Thereafter, when receiving the end notice, the management screen display program unit 220 requests the management program unit 210 to transmit the identifier of each of the management target device 300 and the status of each of the management target devices 300 (see (o)), and acquires the information from the management program unit 210 (see (p) and Step S602 of FIG. 10).

(Advantages of First Process Aspect)

In the first process aspect, the management program unit 210 determines whether the notifying function is turned on (see S200 of FIG. 6). If it is determined that the notifying function is turned on (S200 of FIG. 6: Yes), the management program unit 210 checks the status of the management target device 300, regardless of the execution of the management screen display process (see FIG. 10) by the management screen display program unit 220 (see S204 of FIG. 6, specifically, S404 of FIG. 8: Yes, and S406). On the other hand, if it is determined that the notifying function is turned off (S200 of FIG. 6: No), the management program unit 210 checks the status of the management target device 300 when the management screen display program unit 220 performs the management screen display process (see FIG. 10) in response to an instruction from the user (see S304 of FIG. 7, specifically, S404 of FIG. 8: Yes, and S406).

According to the above-mentioned structure, the management program unit 210 performs the status check process depending on whether the notifying function is turned on or off. It is possible to reduce the load of the status check process performed when the notifying function is turned off.

In the first process aspect, when the notifying function is turned on (S200: Yes), the management program unit 210 periodically checks the status of the management target device 300, regardless of whether the auto refresh function is turned on or off (see S202 of FIG. 6) (see S102 of FIG. 5: Yes, S204 of FIG. 6, specifically, S404 of FIG. 8: Yes, and S406).

According to the above-mentioned structure, when the notifying function is turned on, the management program unit 210 periodically checks the status of the management target device 300, regardless of whether the auto refresh function is turned on or off. Therefore, it is possible to change the status of the management target device notified by the notifying function to a new status that is periodically checked.

In the first process aspect, if the notifying function is turned off (S200 of FIG. 6 and S300 of FIG. 7: No) and the auto refresh function is turned off (S202 of FIG. 6 and S302 of FIG. 7: No), the management program unit 210 does not check the status of the management target device 300 (S204 of FIG. 6 is not performed), but checks the status of the management target device 300 when the management screen display program unit 220 performs the management screen display process (see FIG. 10) in response to an instruction from the user (see S304 of FIG. 7, specifically, S404 of FIG. 8: Yes, and S406). If the notifying function is turned off (S200 of FIG. 6 and S300 of FIG. 7: No) and the auto refresh function is turned on (S202 of FIG. 6 and S302 of FIG. 7: Yes), the management program unit 210 checks the status of the management target device 300, but does not check the status of the management target device 300 (S304 of FIG. 7 is not performed) when the management screen display program unit 220 performs the management screen display process (see FIG. 10) in response to an instruction from the user (see S204 of FIG. 6, specifically, S404 of FIG. 8: Yes, and S406).

According to the above-mentioned structure, it is possible to determine whether to check the status of the management target device 300 when the management screen display process (see FIG. 10) is performed, on the basis of whether the auto refresh function is turned on or off. If the auto refresh function is turned on, the status of the management target device 300 is not checked when the management screen display program unit 220 performs the management screen display process (see FIG. 10). Therefore, it is possible to display a management screen including a relatively new status checked by the auto refresh function. On the other hand, if the auto refresh function is turned off, the status of the management target device 300 is checked when the management screen display program unit 220 performs the management screen display process (see FIG. 10). Therefore, it is possible to display a management screen including the latest status.

(Second Process Aspect)

The first process aspect is based on the operation implemented between the management program unit 210 and the management screen display program unit 220 of the management device 200. In contrast, a second process aspect is based on the operation implemented between the management program unit 210 and the management screen data providing program unit 230. In the second process aspect, a management service process (see FIG. 5), a status check process (see FIG. 8), and a status notifying process (see FIG. 9) implemented by the management program unit 210 are the same as those in the first process aspect, and thus a description thereof will be omitted.

(Periodic Management Process (2))

Figure 13:
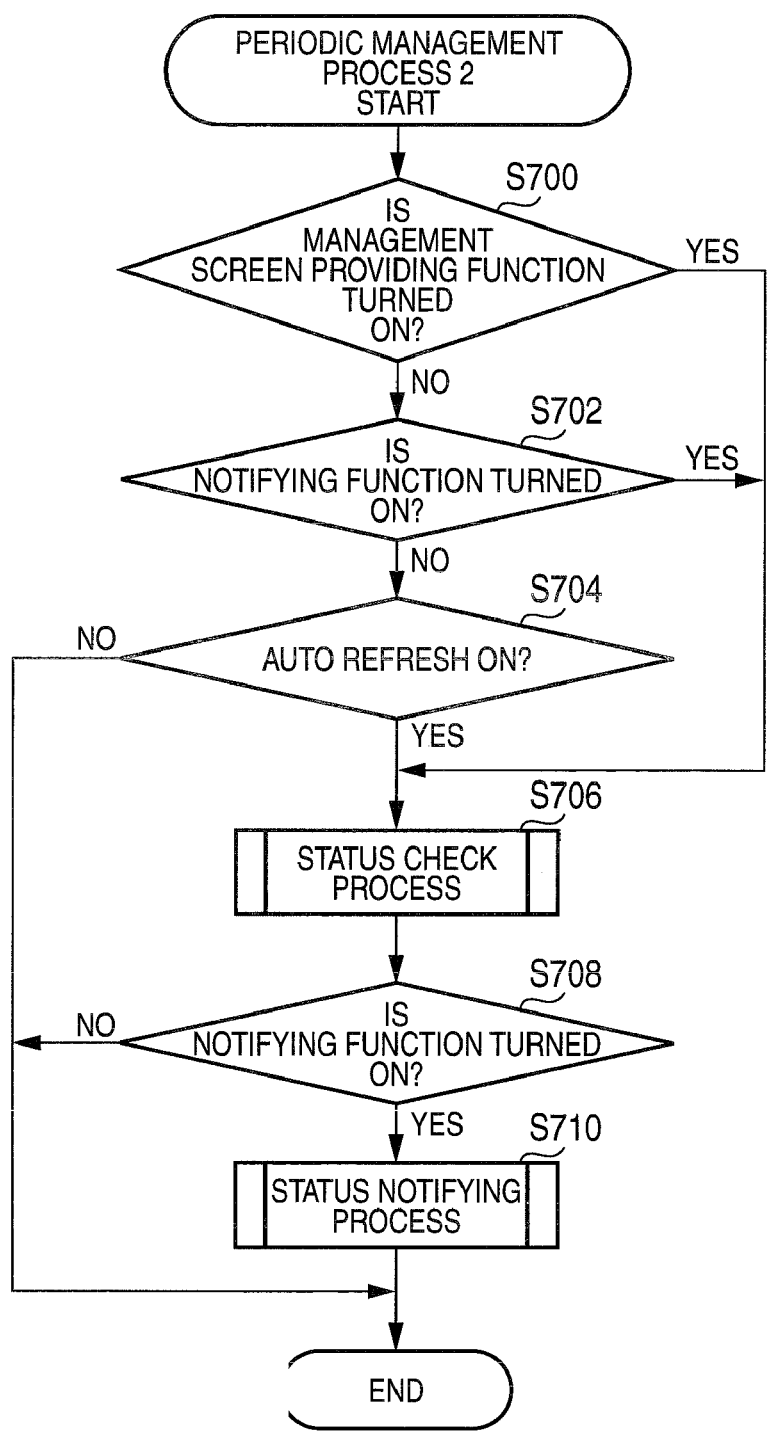
FIG. 13 is a flowchart illustrating a periodic management process (2) in a second process aspect.

FIG. 13 is a flowchart illustrating a periodic management process (2) performed in Step S104 of FIG. 5. The periodic management process (2) is implemented by the management program unit 210. After starting the periodic management process, first, the management program unit 210 determines whether a management screen providing function of providing the management screen to the management client 400 is turned on, on the basis of the set data for setting the on/off of the management screen providing function received from the management screen display program unit 220 and the management screen data providing program unit 230 (see (d) and (e) of FIG. 2 and the external management check box 622 of FIG. 3) (S700). If it is determined that the management screen providing function is turned on (S700: Yes), the management program unit 210 proceeds to Step S706. On the other hand, if it is determined that the management screen providing function is turned off (S700: No), the management program unit 210 proceeds to Step S702.

The process from Step S702 to Step S710 is the same as the periodic management process (see FIG. 6) from Step S200 to Step S208 in the first process aspect. Therefore, a detailed description of Step S702 to Step S710 will be omitted.

(Management Screen Display Process (2))

Figure 14:
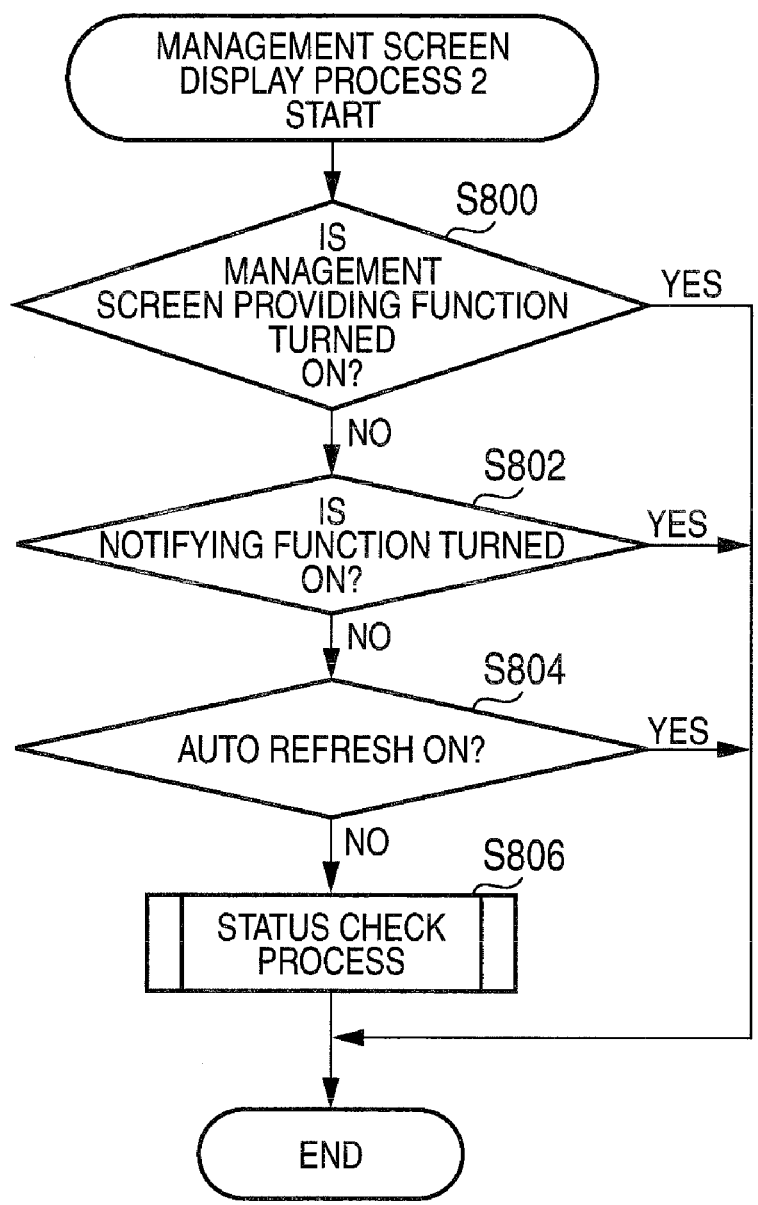
FIG. 14 is a flowchart illustrating a management screen display process (2) in the second process aspect.

FIG. 14 is a flowchart illustrating a management screen display process (2). The management screen display process is implemented by the management program unit 210. This process starts in response to an execution instruction from the management screen display program unit 220 (see (m) of the process sequence shown in FIG. 12 in the first process aspect).

The management program unit 210 determines whether the management screen providing function is turned on (S800). If it is determined that the management screen providing function is turned on (S800: Yes), the management program unit 210 ends the process. On the other hand, if it is determined that the management screen providing function is turned off (S800: No), the management program unit 210 proceeds to Step S802.

The process from Step S802 to Step S806 is the same as the management screen display process (see FIG. 7) from Step S300 to Step S304 in the first process aspect. Therefore, a detailed description of Step S802 to Step S806 will be omitted.

(Management Screen Providing Service Process)

Figure 15:
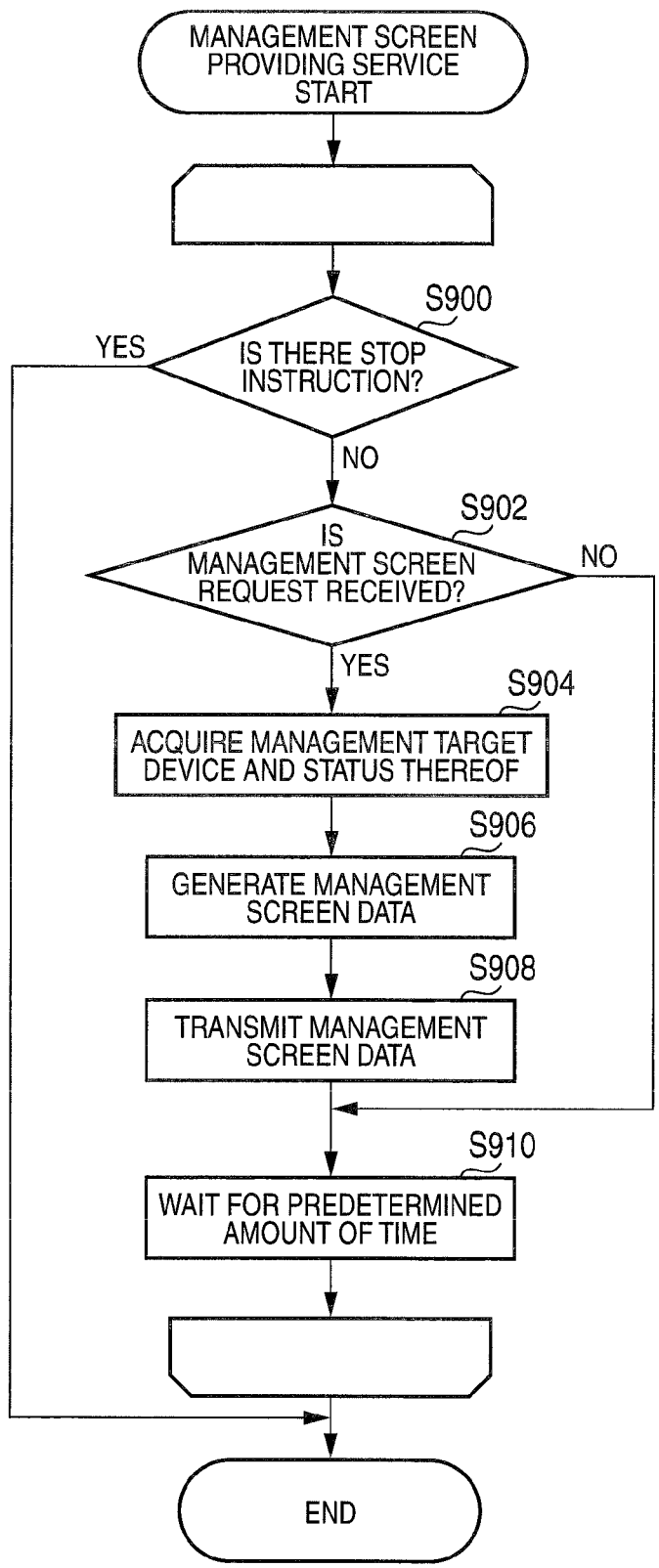
FIG. 15 is a flowchart illustrating a management screen providing service process.

FIG. 15 is a flowchart illustrating a management screen providing service process. The management screen providing service process is implemented by the management screen data providing program unit 230 that starts with the start of the management program unit 210 when it is determined that set data indicating that the management screen providing function is turned on (see the external management check box 622 of FIG. 3) is stored. After starting the process, the management screen data providing program unit 230 determines whether an instruction to stop the process is acquired (S900). For example, when the user of the management device 200 operates the operating unit of the management device 200 to input an instruction to stop the process, the management screen data providing program unit 230 determines that the stop instruction is acquired.

If it is determined that the stop instruction is acquired (S900: Yes), the management screen data providing program unit 230 stops the process. On the other hand, if it is determined that the stop instruction is not acquired (S900: No), the management screen data providing program unit 230 determines whether a management screen request is received (S902). For example, when the user of the management client 400 starts up the screen data display program unit 410 of the management client 400, the management screen data providing program unit 230 receives the management screen request transmitted from the screen data display program unit 410 (see (h) of FIG. 2). If the management screen request is not received (S902: No), the management screen data providing program unit 230 proceeds to Step S910. On the other hand, if the management screen request is received (S902: Yes), the management screen data providing program unit 230 acquires the identifier of each of the management target devices 300 and the status of each of the management target devices 300 from the management program unit 210 (S904) (see (e) and (g) of FIG. 2).

The management screen data providing program unit 230 generates management screen data on the basis of the status acquired from the management program unit 210 (S906), and transmits the management screen data to the screen data display program unit 410 that has transmitted the management screen request (S908).

Then, the management screen data providing program unit 230 waits for a predetermined amount of time and returns to Step S900. Then, the management screen data providing program unit 230 repeatedly performs Steps S900 to S910 until the stop instruction is acquired (S900: Yes). The screen data display program unit 410 (see (i) of FIG. 2) receiving the management screen data transmitted in Step S908 displays a Web device management screen on the monitor of the management client 400 on the basis of the received management screen data.

Figure 16:
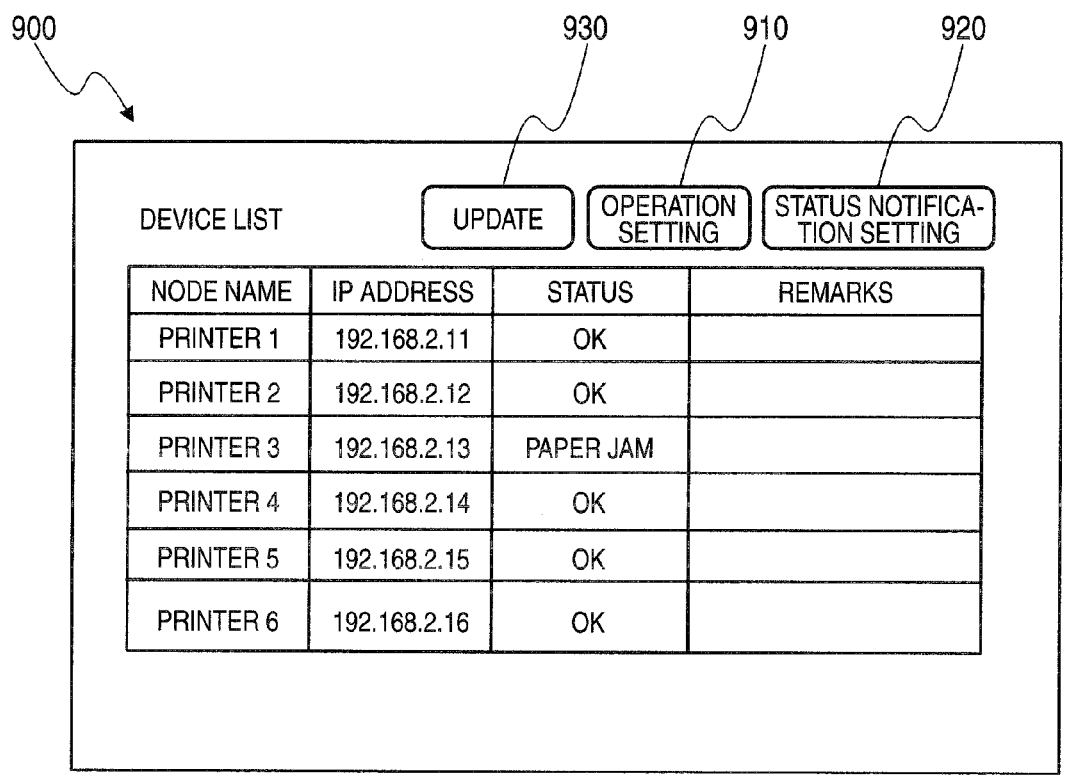
FIG. 16 is a diagram illustrating a Web device management screen.

FIG. 16 shows a Web device management screen 900 displayed on the monitor of the management client 400. The Web device management screen 900 is displayed on the monitor of the management client 400 when the screen data display program unit 410 starts up. The Web device management screen 900 includes the same display items as the management screen 800 shown in FIG. 11, and the IP address and status of each of the management target devices 300 are displayed on the Web device management screen. When the user operates the operating unit of the management client 400 to press an operation setting button 910, the screen data display program unit 410 transmits a set screen request to the management screen data providing program unit 230 (see (j) of FIG. 2). The management screen data providing program unit 230 transmits data indicating an operation setting screen (see FIG. 3) corresponding to the received set screen request to the screen data display program unit 410 (see (k) of FIG. 2). The screen data display program unit 410 receives the data (see (k) of FIG. 2) and displays the operation setting screen shown in FIG. 3 on the monitor.

When a status notification setting button 920 is pressed, the same process as that when the operation setting button 910 is pressed is performed. Then, the screen data display program unit 410 receives data indicating the status notification setting screen (see FIG. 4) transmitted from the management screen data providing program unit 230 (see (i) of FIG. 2) and displays the status notification setting screen shown in FIG. 4 on the monitor. The set data input through the operation setting screen and the status notification setting screen is transmitted from the screen data display program unit 410 to the management screen data providing program unit 230 (see (l) of FIG. 2).

An update button 930 is for requesting the management program unit 210 to perform the same process as that when the update button 840 of the management screen 800 is pressed. When the update button 930 is pressed, the management screen request is transmitted (see (h) of FIG. 2), and the management screen data providing program unit 230 performs the process after Step S902 shown in FIG. 15. The screen data display program unit 410 receives the management screen data transmitted in Step S908 of FIG. 15 (see (i) of FIG. 2) and updates the content displayed on the Web device management screen 900.

(Advantages of Second Process Aspect)

In the second process aspect, it is determined whether the management screen providing function is turned on (see S700 of FIG. 13). If it is determined that the management screen providing function is turned on (S700 of FIG. 13: Yes), the management program unit 210 periodically checks the status of the management target device 300, regardless of whether the notifying function and the auto refresh function are turned on or off (see S102 of FIG. 5: Yes, S104 and S706 of FIG. 13, specifically, S404 of FIG. 8: Yes, and S406).

According to the above-mentioned structure, when the management screen providing function is turned on, it is possible to operate the management device 200 so as to periodically check the status of the management target device 300.

In the second process aspect, if the management screen providing function is turned off (S700 of FIG. 13 and S800 of FIG. 14: No) and the notifying function is turned on (S702 of FIG. 13: Yes), the management program unit 210 periodically checks the status of the management target device 300 regardless of whether the management screen display program unit 220 performs the management screen display process (see FIG. 10) in response to an instruction from the user (see S102 of FIG. 5: Yes, S706 of FIG. 13, specifically, S404 of FIG. 8: Yes, and S406). On the other hand, if the notifying is turned off (S702 of FIG. 13: No), the management program unit 210 checks the status of the management target device 300 when the management screen display program unit 220 performs the management screen display process (see FIG. 10) in response to an instruction from the user (see S806 of FIG. 14, specifically, S404 of FIG. 8: Yes, and S406).

According to the above-mentioned structure, if the management screen providing function is turned off, it is possible to change the check timing of the status of the management target device 300 depending on whether the notifying function is turned on or off. Specifically, if the notifying function is turned on, the status of the management target device 300 is periodically checked. Therefore, it is possible to change the status of the management target device notified by the notifying function to a relatively new status that is periodically checked. On the other hand, if the notifying function is turned off, the status of the management target device 300 is checked when the management screen display process (see FIG. 10) is performed. Therefore, it is possible to display a management screen including the latest status.

(Third Process Aspect)

A third process aspect is based on the operation implemented by the management program unit 210 and the management screen data providing program unit 230, similar to the second process aspect. In the third process aspect, when the management screen providing function is turned on, the timing when the status of the management target device 300 is acquired is changed. A management service process (see FIG. 5), a periodic management process (see FIG. 6), a management screen display process (see FIG. 7), a status check process (see FIG. 8), and a status notifying process (see FIG. 9) implemented by the management program unit 210 are the same as those in the first process aspect and thus a description thereof will be omitted.

(Management Screen Providing Service Process (2))

Figure 17:
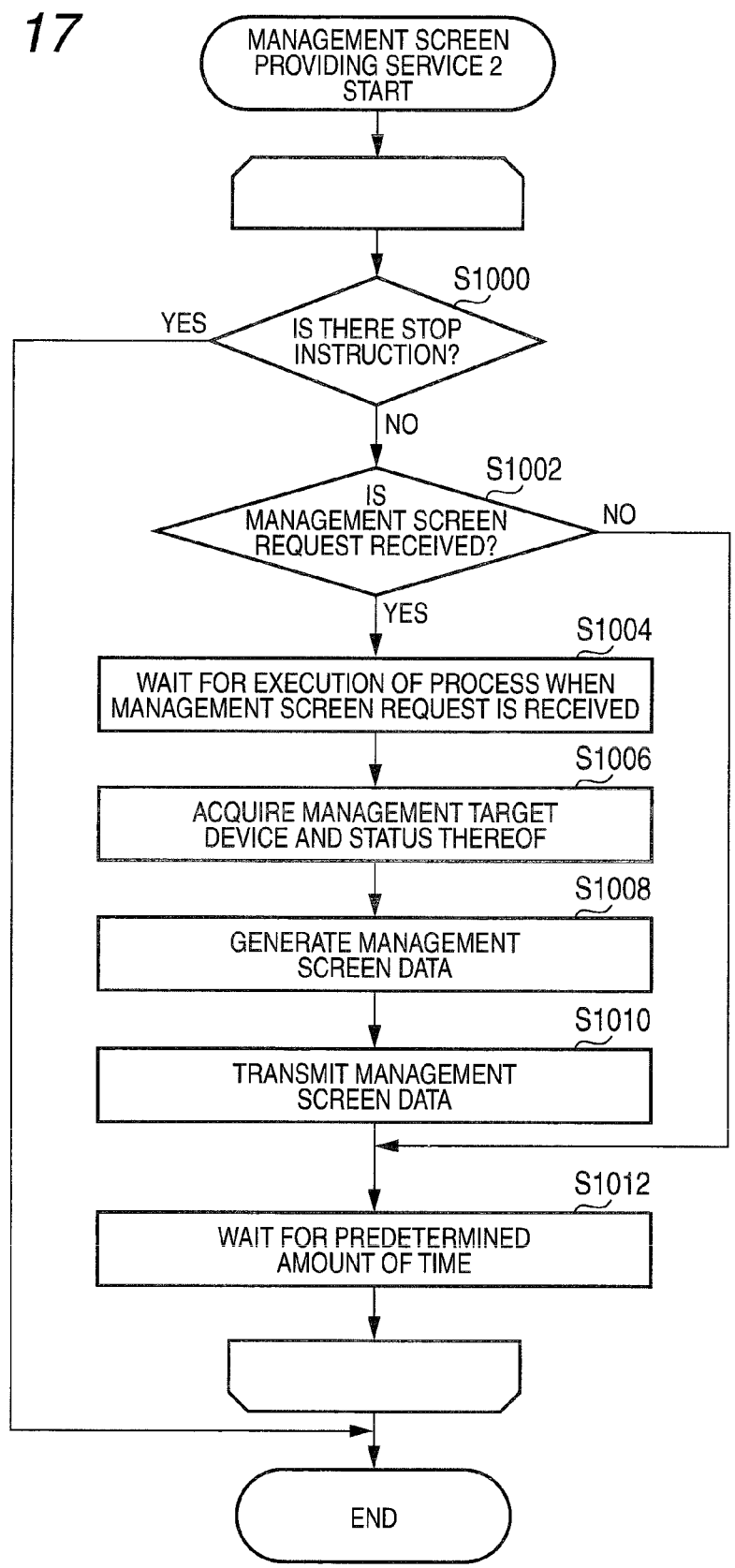
FIG. 17 is a flowchart illustrating a management screen providing service process (2) in a third process aspect.

FIG. 17 is a flowchart illustrating a management screen providing service process (2). In the management screen providing service process (2), when it is determined that set data indicating that the management screen providing function is turned on (see the external management check box 622 of FIG. 3) is stored, the management screen providing service process (2) is implemented by the management screen data providing program unit 230 that starts with the start of the management program unit 210. After starting the process, the management screen data providing program unit 230 determines whether an instruction to stop the process is acquired (S1000). Step S1000 is the same as Step S900 shown in FIG. 15.

If it is determined in Step S1000 that the stop instruction is acquired (S1000: Yes), the management screen data providing program unit 230 stops the process. On the other hand, if it is determined in Step S1000 that the stop instruction is not acquired (S1000: No), the management screen data providing program unit 230 determines whether a management screen request is received (S1002). If the management screen request is received (S1002: Yes), the management screen data providing program unit 230 proceeds to Step S1004. On the other hand, if the management screen request is not received (S1002: No), the management screen data providing program unit 230 proceeds to Step S1012. Step S1002 is the same as Step S902 shown in FIG. 15.

In Step S1004, the management screen data providing program unit 230 waits for the execution of a process by the management program unit 210 when the management screen request is received (see FIG. 18) (S1004). When acquiring an end notice indicating the execution (completion) of the process when the management screen request is received (FIG. 18) in the standby state, the management screen data providing program unit 230 proceeds to Step S1006. Steps S1006 to S1012 are the same as Steps S904 to S910 shown in FIG. 15.

(Process when Management Screen Request is Received)

Figure 18:
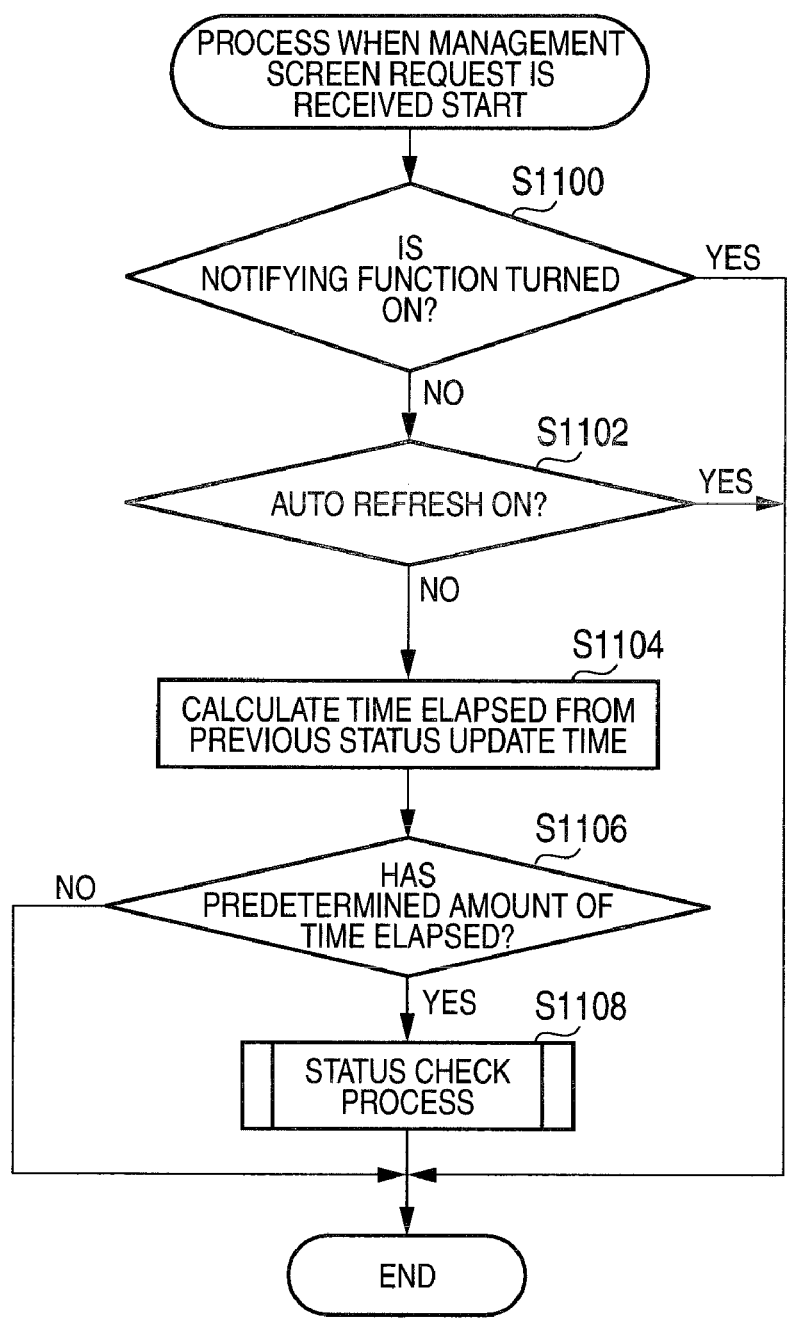
FIG. 18 is a flowchart illustrating a process when a management screen request is received.

FIG. 18 is a flowchart the process when the management screen request is received. The process when the management screen request is received is implemented by the management program unit 210. This process starts in response to an execution instruction from the management screen data providing program unit 230 (which will be described in detail below). After starting the process, the management program unit 210 determines whether the notifying function is turned on (S1100). If it is determined that the notifying function is turned off (S1100: No), the management program unit 210 determines whether the auto refresh function is turned on (S1102). If it is determined that the auto refresh function is turned off (S1102: No), the management program unit 210 proceeds to Step S1104. If it is determined that the notifying function is turned on (S1100: Yes) or if it is determined that the auto refresh function is turned on (S1102: Yes), the management program unit 210 ends the process shown in FIG. 18 without performing the status check process in Step S1108 (see FIG. 8).

In Step S1104, the management program unit 210 calculates the time elapsed from the previous status update time (see S204 of FIG. 6 and S304 of FIG. 7). In the status check process shown in FIG. 8, the management program unit 210 stores the date and time (time) when the status received from the management target device 300 is stored. Then, the management program unit 210 determines whether the calculated elapsed time is equal to or more than a predetermined time (S1106). When a predetermined time has elapsed (S1106: Yes), the management program unit 210 performs the status check process (S1108). In this way, the status of the management target device 300 stored in the management program unit 210 is updated (see S404 of FIG. 8: Yes, S406, and (b) of FIG. 2). On the other hand, when the predetermined time has not elapsed (S1106: No), the management program unit 210 ends the process without performing the status check process in Step S1108 (see FIG. 8). In this case, the status stored in the previous status check process is maintained.

When this process ends, the management program unit 210 transmits an end notice indicating that the process has been finished to the management screen data providing program unit 230 that instructs the start of the process.

Figure 19:
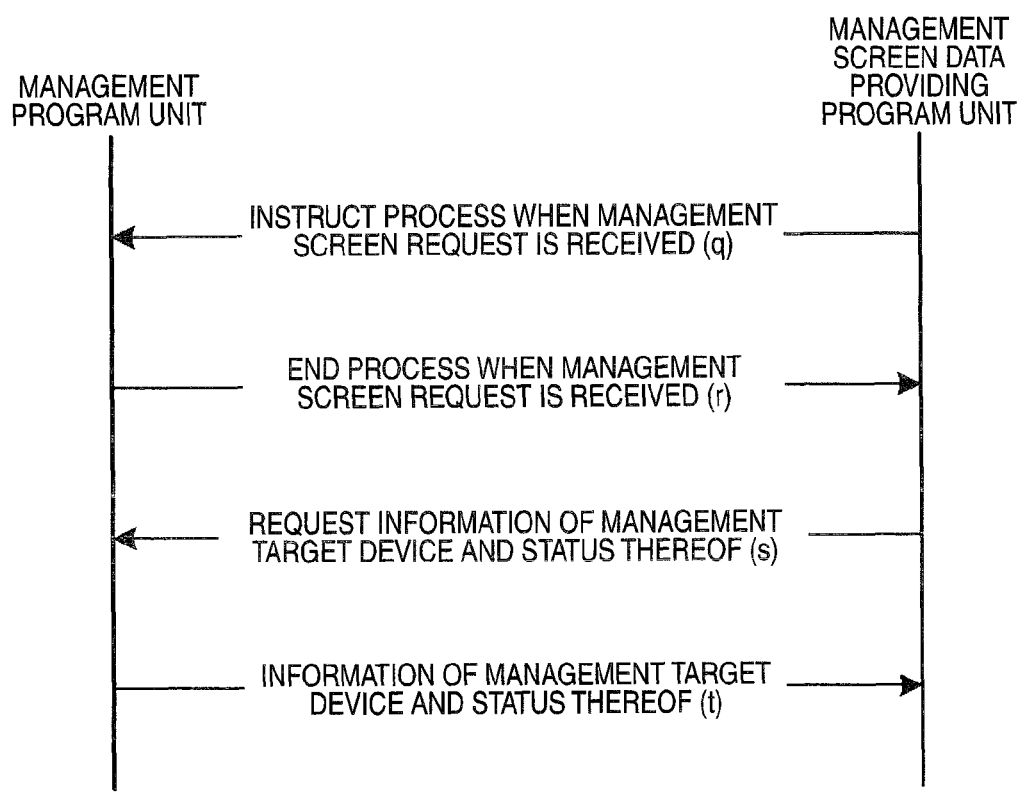
FIG. 19 is a diagram illustrating a process sequence performed between the management program unit and the management screen data providing program unit.

FIG. 19 shows a process sequence related to the management screen data providing process that is performed between the management program unit 210 and the management screen data providing program unit 230. As can be seen from FIG. 19, when starting the management screen display process shown in FIG. 17, the management screen data providing program unit 230 instructs the management program unit 210 to perform the process when the management screen request is received (see (q)). The management screen data providing program unit 230 waits for the reception of the end notice from the management program unit 210 (see Step S1004 of FIG. 17). The management program unit 210 receives an instruction from the management screen data providing program unit 230 and starts the process when the management screen request is received shown in FIG. 18. If the process when the management screen request is received ends, the management program unit 210 transmits an end notice indicating that the process when the management screen request is received has ended to the management screen data providing program unit 230 (see (r)).

Thereafter, when receiving the end notice, the management screen data providing program unit 230 requests the management program unit 210 to transmit the identifiers of the management target devices 300 and the status of each of the management target devices 300 (see (s)), and acquires the information from the management program unit 210 (see (t) and Step S1006 of FIG. 17).

(Advantages of Third Process Aspect)

In the third process aspect, when the set data indicating that the management screen providing function is turned on (see the external management check box 622 shown in FIG. 3) is stored, the management screen data providing program unit 230 starts the management screen providing service (2) shown in FIG. 17. When the management screen data providing program unit 230 receives the management screen request from the management client 400 (see S1002 of FIG. 17: Yes), the auto refresh function is turned off (see S1102 of FIG. 18: No), and the time elapsed from the previous status update time is more than a predetermined period (see S1106: Yes), the management program unit 210 checks the status of the management target device 300 (see S1108 of FIG. 18, specifically, S404 of FIG. 8: Yes, and S406). Then, the management program unit 210 transmits the end notice to the management screen data providing program unit 230 (see (r) of FIG. 19), and the management screen data providing program unit 230 acquires, for example, the status of each of the management target devices 300 from the management program unit 210. Then, the management screen data providing program unit 230 transmits management screen data based on the acquired status to the screen data display program unit 410 of the management client 400 (S1010 of FIG. 17). When the determination result in Step S1106 of FIG. 18 is "Yes" (see S1106: Yes), the status of each of the management target devices 300 provided from the management program unit 210 to the management screen data providing program unit 230 is acquired in Step S1108 and is then stored. On the other hand, when the determination result in Step S1106 of FIG. 18 is "No" (see S1106: No), the status of each of the management target devices 300 provided from the management program unit 210 to the management screen data providing program unit 230 is acquired and stored in the previous status check process.

According to the third process aspect, when the management screen providing function is turned on and the auto refresh function is turned off, it is possible to determine whether to newly check the status of the management target device 300 on the basis of whether a predetermined amount of time has elapsed from the previous status check process. Therefore, it is possible to provide an appropriate status to the screen data display program unit 410 of the management client 400 while reducing the process load of the management device 200.

(Correspondence Between this Embodiment and the Invention)

The management device 200 according to this embodiment corresponds to a management device of the invention. The management program unit 210 according to this embodiment corresponds to a control unit of the invention. The management screen display program unit 220 corresponds to a first management screen supply unit, and the management screen data providing program unit 230 corresponds to a second management screen supply unit. The management target devices 300 (the printing devices 300A and 300B and the multi-function machine 300C) according to this embodiment correspond to devices of the invention, and the management client 400 corresponds to an external device. The management client 400 may correspond to another device (a device notified by a notifying unit) of the invention.

The notifying function according to this embodiment corresponds to a notifying function of the invention, the auto refresh function corresponds to a function of periodically acquiring the status of a device, and the management screen providing function corresponds to a supply function. In this embodiment, the structure that determines whether the set data indicating that the management screen providing function is turned on (see the external management check box 622 shown in FIG. 3) is stored corresponds to a structure of the invention that determines whether the supply function of the second management screen supply unit is valid.

What is claimed is:

1. A management device for managing a device, comprising:
   a control unit that comprises:
      a status acquiring unit that acquires a status of the device;
      a setting unit that allows the user to set a periodic acquisition of the status of the device by the status acquiring unit to be valid or invalid, and
      a notifying unit that, if the device is in a specific status, notifies information about the specific status to another device; and
   a first management screen supply unit that supplies first management screen data to a display unit, the first management screen data being used for showing a first management screen in which the acquired status of the device is indicated,
   wherein
   the control unit determines whether a notifying function of the notifying unit is valid or invalid,
   if the notifying function of the notifying unit is valid, the control unit controls the status acquiring unit to periodically acquire the status of the device regardless of whether the first management screen supply unit starts up or not, and
   if the notifying function of the notifying unit is invalid and the periodic acquisition of the status of the device by the status acquiring unit is set to be invalid, the control unit does not control the status acquiring unit to periodically acquire the status of the device, but controls the status acquiring unit to acquire the status of the device when the first management screen supply unit starts up in response to the instruction from the user, and
   if the notifying function of the notifying unit is invalid and the periodic acquisition of the status of the device by the status acquiring unit is set to be valid, the control unit controls the status acquiring unit to periodically acquire the status of the device, but does not control the status acquiring unit to acquire the status of the device when the first management screen supply unit starts up in response to the instruction from the user.

2. The management device according to claim 1, further comprising:
   a second management screen supply unit that supplies second management screen data to an external device in response to a request from the external device, the second management screen data is used for showing a second management screen in which the acquired status of the device is indicated,
   wherein
   the control unit determines whether a supply function of the second management screen supply unit is valid or invalid, and
   if the supply function of the second management screen supply unit is valid, the control unit controls the status acquiring unit to periodically acquire the status of the device.

3. The management device according to claim 2,
   wherein, in a case where the supply function of the second management screen supply unit is invalid, (a) if the notifying function of the notifying unit is valid, the control unit controls the status acquiring unit to periodically acquire the status of the device, regardless of whether or not the first management screen supply unit starts up, and
   (b) if the notifying function of the notifying unit is invalid, the control unit controls the status acquiring unit to acquire the status of the device when the first management screen supply unit starts up in response to an instruction from the user.

4. The management device according to claim 2,
   wherein the control unit further comprises:
   a setting unit that allows the user to set the periodic acquisition of the status of the device by the status acquiring unit to be valid or invalid, and
   if the supply function of the second management screen supply unit is valid, the control unit controls the status acquiring unit to periodically acquire the status of the device, regardless of whether or not the periodic acquisition of the status of the device by the status acquiring unit is set to be valid or invalid.

5. The management device according to claim 1, further comprising:
   a second management screen supply unit that supplies second management screen data to an external device in response to a request from the external device, the second management screen data being used for showing a second management screen in which the acquired status of the device is indicated; and
   a setting unit that allows the user to set the periodic acquisition of the status of the device by the status acquiring unit to be valid or invalid,
   wherein
   the control unit determines whether or not a supply function of the second management screen supply unit is valid or invalid, and
   in a case where the supply function of the second management screen supply unit is valid and the periodic acquisition of the status of the device by the status acquiring unit is set to be invalid, (i) if elapsed time from the previous acquisition of the status of the device by the status acquiring unit is more than a predetermined amount of time, the control unit controls the status acquiring unit to acquire the status of the device when the second management screen supply unit supplies the second management screen data to the external device in response to the request from the external device, such that the second management screen supply unit supplies the second management screen data indicating the currently acquired status of the device, and (ii) if the elapsed time is not more than the predetermined amount of time, the control unit does not control the status acquiring unit to acquire the status of the device when the second management screen supply unit supplies the second management screen data to the external device in response to the request from the external device, such that the second management screen supply unit supplies the second management screen data indicating the previously acquired status of the device.

6. A computer readable storage device for storing a program for configuring a management device to perform as a control unit and a first management screen supply unit, wherein the control unit comprises:
   a status acquiring unit that acquires a status of the device;
   a notifying unit that, if the device is in a specific status, notifies information about the specific status to another device; and
the first management screen supply unit supplies first management screen data to a display unit, the first management screen data being used for showing a first management screen in which the acquired status of the device is indicated,
and wherein
the control unit determines whether a notifying function of the notifying unit is valid or invalid, if the notifying function of the notifying unit is valid, the control unit controls the status acquiring unit to periodically acquire the status of the device, regardless of whether or not the first management screen supply unit starts up, and if the notifying function of the notifying unit is invalid, the control unit controls the status acquiring unit to acquire the status of the device when the first management screen supply unit starts up in response to an instruction from a user.

7. A method for managing a device, the method comprising the steps of:
   acquiring a status of the device;
   notifying, if the device is in a specific status, information about the specific status to another device; and
   supplying first management screen data to a display unit, the first management screen data being used for showing a first management screen in which the acquired status of the device is indicated,
wherein
determining whether a notifying function of the notifying step is valid or invalid,
if the notifying function of the notifying step is valid, periodically acquiring the status of the device regardless of whether the supplying step starts up or not, and
if the notifying function of the notifying step is invalid, acquiring the status of the device when the supplying step starts up in response to an instruction from a user.

* * * * *